US010596538B2

(12) United States Patent
Rizzi

(10) Patent No.: US 10,596,538 B2
(45) Date of Patent: Mar. 24, 2020

(54) AXIAL-RADIAL FLOW CATALYTIC CHEMICAL REACTOR WITH TWO LAYERS OF CATALYST

(71) Applicant: Casale SA, Lugano (CH)

(72) Inventor: Enrico Rizzi, Casnate con Bernate (IT)

(73) Assignee: Casale SA, Lugano (CH)

( * ) Notice: Subject to any disclaimer, the term of this patent is extended or adjusted under 35 U.S.C. 154(b) by 0 days.

(21) Appl. No.: 16/335,825

(22) PCT Filed: Sep. 21, 2017

(86) PCT No.: PCT/EP2017/073944
§ 371 (c)(1),
(2) Date: Mar. 22, 2019

(87) PCT Pub. No.: WO2018/055054
PCT Pub. Date: Mar. 29, 2018

(65) Prior Publication Data
US 2020/0023330 A1 Jan. 23, 2020

(30) Foreign Application Priority Data
Sep. 23, 2016 (EP) .................................. 16190502

(51) Int. Cl.
B01J 8/04 (2006.01)
B01D 53/86 (2006.01)
(52) U.S. Cl.
CPC ........ *B01J 8/0465* (2013.01); *B01D 53/8631* (2013.01); *B01D 2251/2062* (2013.01);
(Continued)

(58) Field of Classification Search
CPC .............. B01D 53/0431; B01D 53/565; B01D 53/8631; B01D 2252/50; B01D 2252/504;
(Continued)

(56) References Cited

U.S. PATENT DOCUMENTS 6,059,863 A * 5/2000 Monereau .......... B01D 53/0431
96/132
9,238,196 B2 * 1/2016 Schwefer ........... B01D 53/8696
(Continued)

FOREIGN PATENT DOCUMENTS

| EP | 0 935 995 A1 | 8/1999 |
| JP | S61 171530 A | 8/1986 |
| WO | 99/20384 A1 | 4/1999 |
| WO | 01/23080 A1 | 4/2001 |

OTHER PUBLICATIONS

International Search Report issued in connection with PCT/EP2017/073944.
International Preliminary Report on Patentability issued in connection with PCT/EP2017/073944.
(Continued)

Primary Examiner — Timothy C Vanoy
(74) Attorney, Agent, or Firm — Akerman LLP

(57) ABSTRACT

Axial-radial flow reactor comprising a catalytic bed (1) of a hollow cylindrical shape, having a vertical axis (2), a base (5), a radial gas inlet section (3b), an axial gas inlet section (6) and a radial gas outlet section (4b), wherein the catalytic bed (1) comprises: a first cylindrical annular region (10) containing a layer of a first catalyst (A) and a layer of a second catalyst (B), the layer of the first catalyst being above the layer of the second catalyst; a second cylindrical annular region (9) coaxial to the first annular region and containing only the first catalyst (A).

15 Claims, 2 Drawing Sheets

(52) U.S. Cl.
CPC .. *B01D 2257/402* (2013.01); *B01D 2257/404* (2013.01); *B01D 2258/02* (2013.01); *B01J 2208/0084* (2013.01); *B01J 2208/00884* (2013.01); *B01J 2208/025* (2013.01); *B01J 2208/027* (2013.01)

(58) Field of Classification Search
CPC .......... B01D 2255/00; B01D 2255/904; B01D 2257/402; B01D 2257/404; B01J 15/00; B01J 15/005; B01J 19/00; B01J 19/243; B01J 19/244; B01J 35/0006; B01J 35/00; B01J 2219/00295; B01J 2219/00299; B01J 2219/32279
See application file for complete search history.

(56) References Cited

U.S. PATENT DOCUMENTS

| | | |
|---|---|---|
| 2006/0051277 A1 | 3/2006 | Schwefer et al. |
| 2006/0142628 A1* | 6/2006 | Williams ............... B01J 8/0411 585/444 |
| 2018/0280873 A1* | 10/2018 | Granger ............. B01D 53/8628 |

OTHER PUBLICATIONS

European Search Report issued in connection with corresponding European Patent Application No. 16 19 0502.

* cited by examiner

AXIAL-RADIAL FLOW CATALYTIC CHEMICAL REACTOR WITH TWO LAYERS OF CATALYST

This application is a national phase of PCT/EP2017/073944, filed Sep. 21, 2017, and claims priority to EP 16190502.1, filed Sep. 23, 2016, the entire contents of both of which are hereby incorporated by reference.

FIELD OF APPLICATION

The invention relates to the field of catalytic chemical reactors. The invention in particular relates to the field of reactors which involve the use of two different catalysts.

PRIOR ART

Some chemical processes require a gas flow to pass in sequence through a first catalyst and subsequently through a second catalyst.

The incoming gas flow may consist for example of a reagent mixture or a gas flow to be conditioned.

An example of considerable practical importance is the removal of nitrogen oxides NOx and nitrous oxide $N_2O$ from gas flows. A gas flow containing NOx and $N_2O$ may be produced by combustion or by an industrial process. For example the synthesis of nitric acid releases an off-gas current containing NOx and $N_2O$.

The processes for removing said pollutants comprise a passage through a catalyst in order to decompose $N_2O$ into nitrogen and oxygen and a passage through another catalyst in order to react residual $N_2O$ and NOx with a suitable reducing agent.

It is known therefore to realize chemical reactors comprising two catalytic beds arranged so as to be crossed in sequence by an incoming gas flow.

Catalytic beds may be distinguished according to the direction of the traversing gas flow, for example axial or radial.

A radial catalytic bed, in particular, is delimited by two coaxial cylindrical walls which define an inlet section and outlet section respectively. The gas flow passes through the catalyst radially from the outside towards the inside (inward crossing) or vice versa from the inside towards the outside (outward crossing).

The radial bed configuration has a series of recognized advantages, but also has a drawback. The top part of the catalytic bed is subject to settling of the catalyst which compacts under its own weight, leaving a free space which forms a path bypassing the catalytic bed. It is therefore necessary that the inlet and outlet sections do not extend up to the top of the catalytic bed to avoid that gas is directed to said bypass path but, consequently, the upper part of the bed remains substantially unused.

In other words, in a purely radial catalytic bed, a portion of catalyst has the function of sealing off the bypass, but does not contribute to the desired chemical reaction. It follows, for the same performance, a greater volume of the bed and the reactor, as well as a greater quantity of catalyst. Both these factors increase the cost of the equipment. Another drawback, of a constructional nature, is that the top closure of catalytic beds, again in order to prevent partial bypassing of the bed, must be gas-tight. This means that the closing cover of the beds is heavier, more complex in design and more costly. The operations for opening and closing the beds are also longer and more complex.

The drawbacks described above are solved by axial-radial flow catalytic beds. An axial-radial flow catalytic bed has a radial inlet section and also an axial inlet section which is typically formed by the top annulus of the bed. The outlet section generally is radial. The incoming gas is fed partly through the radial inlet section and partly through the axial inlet section; inside the bed, therefore, a mixed flow comprising a radial component and an axial component is formed.

An axial-radial catalytic bed provides the advantages of a radial bed avoiding the aforementioned drawback, since the top part of the catalytic bed is also conveniently exploited (owing to the axial inlet) and settling of the catalyst does not cause bypassing.

However, the axial-radial bed configuration, according to the prior art, is not considered to be suitable for the processes of the type considered here which require the flow to pass through two catalysts. The axial-radial flow requires the arrangement of the two catalysts in a concentric manner; with this coaxial-bed arrangement, however, part of the axially entering gas would come into contact directly with the second catalyst and leave the bed substantially without having passed through the first catalyst, contrary to the desired process. For this reason, so far, the axial-radial reactor technology has been regarded as being not suitable for application to reactors with concentric layers of catalyst.

JP-S61-171530 discloses a reforming vessel comprising an oxidizing agent introduction pipe immersed in a combustion catalyst contained in a partition pipe, and a reforming catalyst in the gap between the partition pipe and the container.

WO 99/20384 discloses a radial-flow reactor with coaxial catalyst beds.

WO 01/23080 discloses an axial-radial or radial-flow reactor with a catalyst bed of a single catalyst and wherein a space between the exterior surface of the catalyst bed and the interior walls of the reactor is filled with particulate material.

SUMMARY OF THE INVENTION

The invention aims to overcome the drawbacks of the prior art by providing an axial-radial flow catalytic bed configuration suitable for reactions which require the passage in sequence through two catalysts.

The object is achieved with a catalytic reactor adapted to process a gas flow by sequential passage through a first catalyst and a second catalyst, said reactor comprising a catalytic bed of a hollow cylindrical shape, having a vertical axis, a base, a radial gas inlet section, an axial gas inlet section and a radial gas outlet section, wherein the gas inlet section and the gas outlet section are arranged to provide an axial-radial flow through the catalytic bed, and wherein the axial inlet section is at an upper surface of the catalytic bed, the reactor being characterized in that said catalytic bed comprises:

a first cylindrical annular portion extending from the base of the catalytic bed to the axial inlet section and containing only the first catalyst;

a second cylindrical annular portion extending from the base of the catalytic bed to the radial inlet section, said second annular portion being coaxial to the first annular portion and containing a layer of the first catalyst and a layer of the second catalyst, the layer of the first catalyst being above the layer of the second catalyst.

Preferably a boundary between said first annular portion and second annular portion is a cylindrical vertical surface.

Said surface is gas-permeable. Preferably said surface has a vertical axis parallel to the axis of the reactor.

The first catalyst is adapted to catalyse a first chemical reaction and the second catalyst is adapted to catalyse a second reaction, said first reaction and second reaction being different. In a preferred embodiment the first reaction and the second reaction are reactions to remove N2O and/or NOx from the input gas flow.

The radial gas inlet section and the radial gas outlet section preferably comprise, or are represented by, a cylindrical gas-permeable wall or wall system. A gas-permeable wall for example is provided with holes or slots of a suitable size for allowing gas to pass through and at the same time for retaining the catalyst.

In a preferred embodiment, the radial inlet section and the radial outlet section comprise or are represented by cylindrical walls with an upper portion, proximal to the top axial inlet section, which is not gas-permeable. In this way the axial entry of the gas and the formation of the desired axial-radial mixed flow are facilitated. In some embodiments a double cylindrical wall system may be provided. An example of a suitable double wall system is described in EP 2 014 356.

The axial inlet section can be formed by the top surface (top annulus) of the catalytic bed. Said top surface of the catalytic bed can be an open surface in some embodiments. In some embodiments, the axial inlet section includes a gas-permeable cover, for example a perforated cover.

The following are further preferred embodiments of the invention.

In the second cylindrical annular portion, the layer of the second catalyst (bottom layer) may extend from the base of the catalytic bed to a predetermined boundary level, and the layer of the first catalyst (upper layer) may extend above the layer of the second catalyst, from said boundary level up to the axial inlet section.

Preferably the volume of the second catalyst in the second annular portion of the catalytic bed accounts for at least 50% of the total volume of the second annular portion. More preferably said volume of second catalyst is 50% to 95%, even more preferably 60% to 90% of the total volume of the second annular portion. These preferred embodiments provide a sufficient amount of both catalysts taking into account the axial-radial flow.

The gas outlet section, in a preferred embodiment, is located entirely below said boundary level, i.e. in correspondence of the layer of the second catalyst. More preferably, the reactor comprises a cylindrical wall or wall system having a gas-tight upper portion and a gas-permeable lower portion. The upper and non-permeable wall portion extends from the axial inlet section at least to said boundary level between the two catalysts; the lower gas-permeable portion (below the boundary level) provides said gas outlet section. The gas-permeable wall portion can be, for example, a perforated wall portion. Preferably, only the second catalyst is in contact with said perforated wall portion.

It can be appreciated that the upper layer of first catalyst (in the second annular portion of the catalytic bed) is a region of predominantly axial flow.

In some embodiments, the reactor may comprise a floating baffle which extends at least in the second cylindrical annular portion and separates the layer of the first catalyst from the layer of the second catalyst. The provision of this floating baffle however is not essential to the invention. Said baffle may be appropriate e.g. to maintain a good separation between the first catalyst and the second catalyst if the catalysts tend to mix. In some embodiments the two catalysts do not significantly mix during operation (for example due to their particle size) and the floating baffle is not necessary. The floating baffle is also permeable to gas, for example comprising appropriate holes or slots.

According to a further embodiment, the first annular portion and the second annular portion are separated by a gas-permeable separation baffle. In a more preferred embodiment said separation baffle extends from the bottom of the catalytic bed up to the inlet section, in such a way that the catalytic bed is fully divided into two coaxial portions, one portion containing solely the first catalyst, the other portion containing a layer of first catalyst above a layer of second catalyst.

In a particularly preferred embodiment, said catalytic bed is of the inward axial-radial flow type. Accordingly, said first annular portion is an outer region of the catalytic bed and said second annular portion is an inner region of the catalytic bed. The first portion is arranged coaxially around the second portion. Thus, the inwardly directed flow crosses in sequence the first catalyst and the second catalyst.

A preferred application of the invention concerns the removal of pollutants $N_2O$ and nitrogen oxides NOx from a gaseous stream. In such a case, in a preferred embodiment, the first catalyst is suitable to decompose $N_2O$ into nitrogen and oxygen and the second catalyst is suitable to react NOx and $N_2O$ with a reducing agent. Said reducing agent is preferably ammonia.

In a particularly preferred application, the said gas flow containing NOx and $N_2O$ is an offgas current produced in a nitric acid synthesis process.

A further aspect of the invention is a process for the removal of nitrogen oxides NOx and nitrous oxide $N_2O$ from a gas stream, according to the attached claims.

The catalyst bed of the invention comprises an upper region which is in a direct communication with the gas inlet section and which contains only the first catalyst. A second region of the catalytic bed, which is below said upper region, contains two concentrically arranged layers of the first catalyst and of the second catalyst. Only this second region is in a direct communication with the gas outlet section.

Therefore, a gas stream entering the catalytic bed via the radial or axial inlet section encounters sequentially a layer of the first catalyst and a layer of the second catalyst, the first catalyst being traversed first.

Still further aspects and preferred embodiments of the invention are as follows.

1. An aspect of the invention is a catalytic reactor adapted to process a gas flow by sequential passage through a first catalyst and a second catalyst, said reactor comprising a catalytic bed of a hollow cylindrical shape, having a vertical axis and having at least a lateral radial inlet section and at a top axial inlet section so as to determine an axial-radial flow through the bed, and having an outlet section, wherein:
said catalytic bed comprises a first head zone which is adjacent to said top axial inlet section, and a second zone below said head zone;
said head zone of the catalytic bed contains solely the first catalyst and does not face said outlet section of the catalytic bed, so that the effluent gas of said head zone passes into the underlying second zone of the catalytic bed;
said second zone of the catalytic bed contains a layer of the first catalyst and a layer of the second catalyst, said layers being arranged coaxially one around the other.

2. A further embodiment is a reactor according to point 1. above, comprising a gas-permeable separating baffle (8) between said two coaxial layers (9, 10) of the second zone (14) of the catalytic bed.

3. A further embodiment is a reactor according to the above point 2. wherein the separating baffle extends also into the head zone of the catalytic bed, the catalytic bed thus being divided into two coaxial portions, the first of said coaxial portions containing only the first catalyst, the second of said coaxial portions containing a layer of second catalyst up to a predefined level and containing a layer of first catalyst above said level.

4. A further embodiment is a reactor according to the point 3. above, wherein the second coaxial portion comprises a floating baffle which separates the layer of first catalyst from the layer of second catalyst.

5. A further embodiment is a reactor according to any of the above points 1 to 4, wherein said catalytic bed is of the inward axial-radial flow type and wherein, in the second zone of the catalytic bed containing two coaxial layers of the first and the second catalyst, the first catalyst is situated externally of the second catalyst.

6. A further embodiment is a reactor according to any one of the above points 1 to 5, wherein the top axial inlet section of the catalytic bed is an open top section or has a gas-permeable cover.

7. A further embodiment is a reactor according to any one of the above points 1 to 6, wherein the first catalyst is suitable to decompose $N_2O$ into nitrogen and oxygen and the second catalyst is suitable to react NOx and $N_2O$ with a reducing agent.

The invention, in its various embodiments, is able to exploit the advantages of the axial-radial mixed flow catalytic bed also in processes which require the passage of a gas through two catalysts in sequence. The layered arrangement of the first catalyst and second catalyst prevents the input gas from bypassing the first catalyst. In particular, the arrangement of the invention provides that the upper section of the catalytic bed, near the axial gas inlet, contains only the first catalyst, so that the input gas must pass through the first catalyst before reaching the layer of the second catalyst. The advantages comprise in particular: efficient use of the catalyst, uniformity of the chemical reaction, uniform consumption of the catalyst, advantageous ratio of catalyst mass to volume (hence cost) of the apparatus.

The advantages of the invention will become more evident with the aid of the following detailed description.

DESCRIPTION OF PREFERRED EMBODIMENTS

Figure 1:
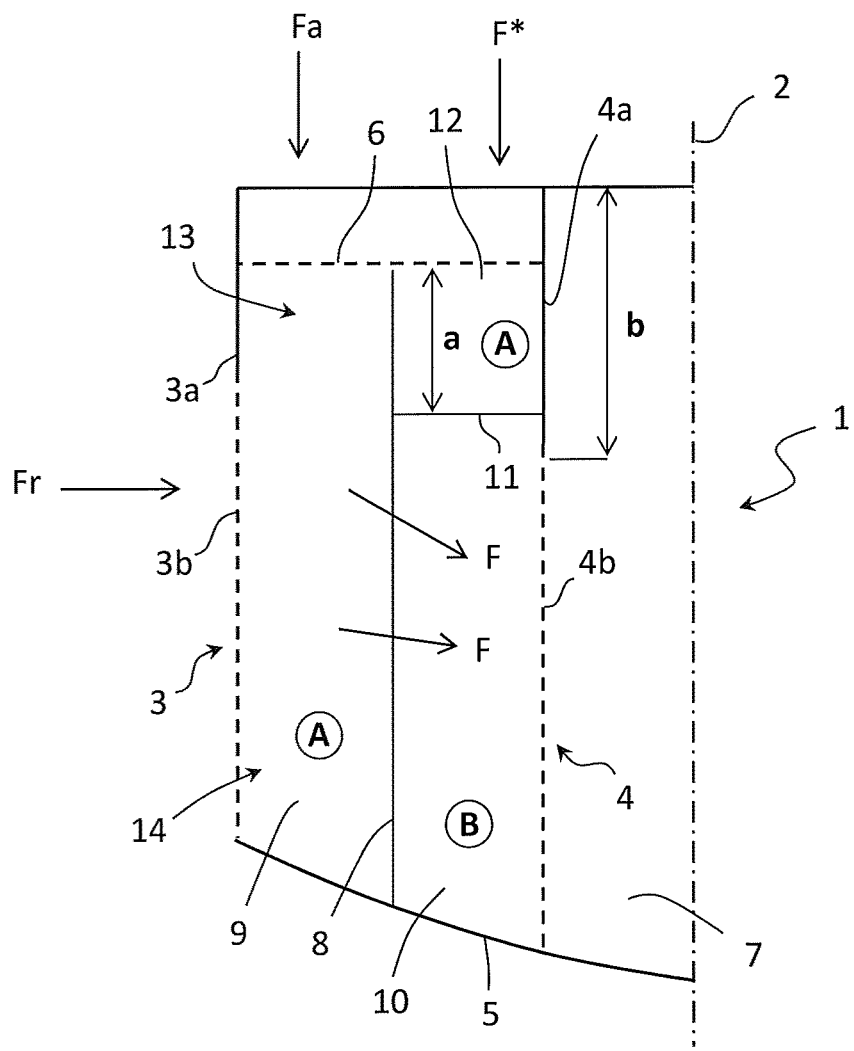
FIG. 1 is a simplified diagram of a dual-layer catalytic bed according to an embodiment of the invention.

FIG. 1 shows a diagram of a catalytic bed 1 with a hollow cylindrical form which extends around a vertical axis 2.

Figure 2:
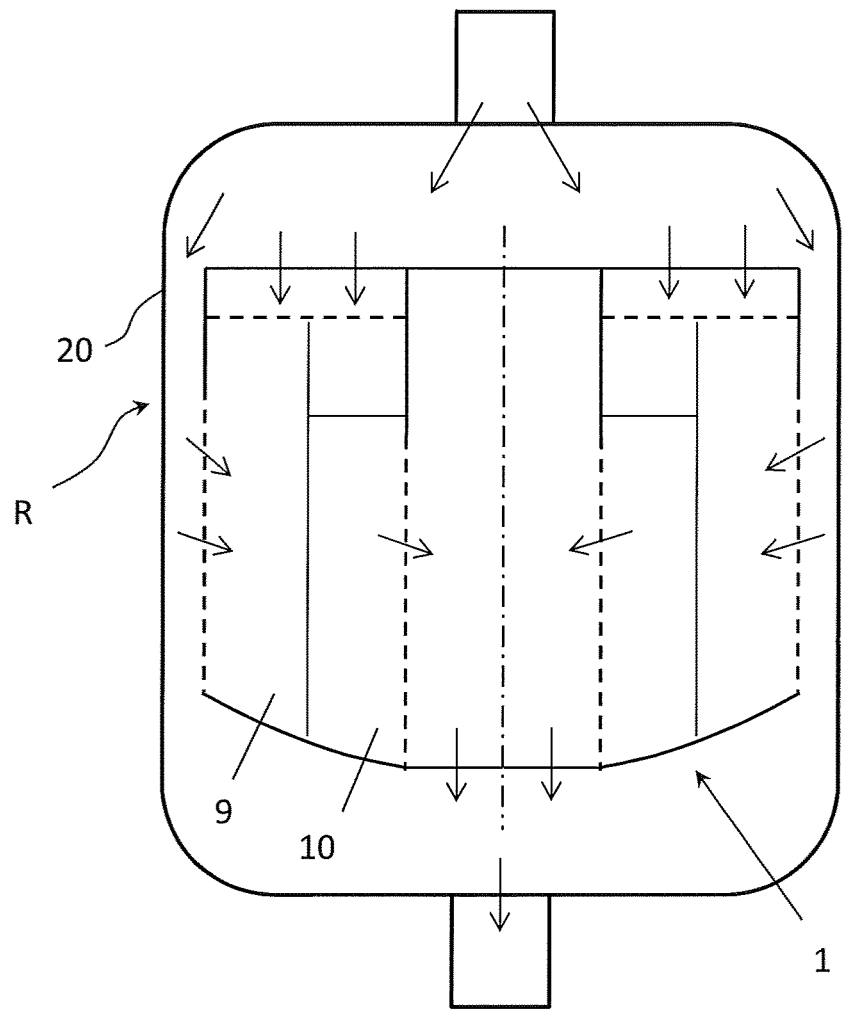
FIG. 2 is a sketch of a reactor comprising the catalytic bed of FIG. 1.

The catalytic bed 1 is contained inside a chemical reactor R (FIG. 2). Said reactor has a pressurized shell 20 preferably having an axis coinciding with the axis 2.

The catalytic bed 1 is delimited by an outer cylindrical wall 3, an inner cylindrical wall 4, a base 5 and a top surface (annulus) 6.

The cylindrical walls 3 and 4 have continuous portions 3a, 4a and portions 3b, 4b which are permeable to gases, for example perforated. The surface or annulus 6 is at least partly gas-permeable. In some embodiments the surface 6 is an open top surface of the catalytic bed.

A gas flow supplied to the catalytic bed 1 comprises a fraction Fr which enters the bed radially through the perforated wall portion 3b and a fraction Fa which enters the bed axially through the annular surface 6.

A mixed axial-radial flow F, indicated by the arrows, is established inside the catalytic bed 1 as a result of the flows Fr, Fa. The gas leaving the bed 1 passes through the perforated wall portion 4b and is collected inside a central tube 7.

The gas-permeable wall portions 3b and 4b define respectively a radial inlet section and a radial outlet section of the catalytic bed 1. In this example the radial flow is directed towards the axis 2 and consequently is termed inward radial flow. The annular surface 6 instead forms an axial inlet section of the catalytic bed 1.

The catalytic bed 1 comprises a gas-permeable partition baffle 8 substantially parallel to the cylindrical walls 3 and 4. The partition baffle 8 defines two cylindrical annular portions of the catalytic bed, namely a first outer portion 9 and a second inner portion 10. Said portions 9 and 10 have a hollow cylindrical form and are coaxial.

The outer portion 9 is filled entirely with a first catalyst A.

The inner portion 10 is filled with a second catalyst B up to a predefined level 11. Above the level 11 the inner portion 10 is filled with the first catalyst A, i.e. the same catalyst as the outer portion 9. The level 11 forms a boundary between the layers of catalyst A and B in the inner portion 10.

The inner portion 10 therefore contains two layers of catalyst arranged on top of each other, i.e. the layer of catalyst B in the bottom/central zone and the layer of catalyst A in the top zone 12 above the level 11 and above the catalyst B.

Owing to this arrangement, the overall catalytic bed 1 has a head zone 13, situated between the inlet section 6 and the level 11, containing only the catalyst A, and an underlying zone 14, containing two coaxial layers of catalyst A and B.

The level 11 in some embodiments is defined by a floating separation baffle, preferably a metallic mesh. In other embodiments a physical separating baffle is not necessary, i.e. the catalyst A in the zone 12 is poured directly over the previously loaded layer of catalyst B; therefore the boundary 11 will be understood as an interface and separation plane between the two catalysts. This is possible when the two catalysts do not substantially mix during operation and are suitably compacted.

The head zone 13 has a depth a, measured along the direction of the axis 2 from the axial inlet section 6. In the example said depth a is also the height of the zone 12 filled with catalyst A, situated above the layer of catalyst B.

The gas-tight wall portion 4a extends for a distance b. The lower end of the wall portion 4a is preferably below the level 11. When the lower end of the wall portion 4a is below the level 11, the head zone 13 does not face directly the perforated wall portion 4b and consequently the effluent of the upper zone 13, irrespective of the distance from the axis 2, always passes through the catalyst B before it can reach the outlet section 4b and leave the catalytic bed 1.

As can be noted from FIG. 1, all the gas entering the catalytic bed 1 passes sequentially through the catalyst A and then through the catalyst B before reaching the outlet section 4b. This is true, in particular, also for the flow F* entering close to the axis 2 which traverses the catalyst A in the zone 12 and traverses the catalyst B before flowing out through the perforated wall 4b. In the head zone 13 of the catalytic bed, the flow is predominantly axial while in the lower parts of the catalytic bed and near the outlet section the radial component becomes substantial.

It can be appreciated that in absence of the layer of catalyst A in the zone 12, the near-axis flow F* would encounter substantially only the catalyst B to the detriment of the reactor efficiency. The invention avoids this drawback: in the axial-flow upper zone 13, the axially entering gas passes through the first catalyst, as well as the radially entering gas from the permeable wall 3b. Then, all the partially conditioned gas passes through the second catalyst in the route towards the outlet section 4b.

Accordingly, the invention achieves the goal of applying the axial-radial mixed flow configuration, along with its advantages, to the processes which requires a sequential passage through two catalysts A and B. The invention ensures that all the incoming gas passes through the two catalysts as desired, preventing bypassing of the first catalyst A.

A reactor R comprising the previously described catalytic bed 1 is further illustrated in FIG. 2. The arrows in the figure show the axial-radial flow in the reactor R.

What is claimed is:

1. A catalytic reactor adapted to process a gas flow by sequential passage through a first catalyst and a second catalyst,
   said reactor comprising a catalytic bed of a hollow cylindrical shape, having a vertical axis, a base, a radial gas inlet section, an axial gas inlet section and a radial gas outlet section, arranged to determine an axial-radial flow through the catalytic bed, the axial inlet section being at an upper end of the catalytic bed;
   wherein said catalytic bed comprises:
   a first cylindrical annular portion extending from said base of the catalytic bed to the axial inlet section, and containing only the first catalyst;
   a second cylindrical annular portion extending from said base of the catalytic bed to the axial inlet section, said second annular portion containing a layer of said first catalyst and a layer of said second catalyst, the layer of the first catalyst being above the layer of the second catalyst, and said first annular portion and second annular portion being arranged coaxially one around the other.

2. The reactor according to claim 1, wherein the first catalyst is intended to catalyse a first chemical reaction and the second catalyst is intended to catalyse a second reaction, said first reaction and second reaction being different.

3. The reactor according to claim 1, wherein a boundary between said first annular portion and said second annular portion is a vertical cylindrical surface.

4. The reactor according to claim 1, wherein:
   in the second annular portion, the layer of the second catalyst extends from the base of the catalytic bed to a predetermined boundary level, and the layer of the first catalyst extends above the layer of the second catalyst from said boundary level to the axial inlet section.

5. The reactor according to claim 4, wherein said gas outlet section is a cylindrical surface located entirely below said boundary level.

6. The reactor according to claim 5, wherein:
   the reactor comprises a cylindrical wall having an upper portion which is not gas-permeable and extends at least from the axial inlet section to said boundary level, and a gas-permeable lower portion which is below said boundary level and provides said radial gas outlet section.

7. The reactor according to claim 1, wherein:
   the reactor comprises a floating baffle which separates the layer of the first catalyst from the layer of the second catalyst in the second annular portion.

8. The reactor according to claim 1, wherein:
   the first annular portion and the second annular portion are separated by a gas-permeable separation baffle.

9. The reactor according to claim 8, wherein said separation baffle extends from the base of the catalytic bed up to the axial inlet section.

10. The reactor according to claim 1, wherein said catalytic bed is of the inward axial-radial flow type, said first annular portion is an outer region of the catalytic bed, said second annular portion is an inner region of the catalytic bed.

11. The reactor according to claim 1, wherein said axial gas inlet section of the catalytic bed is an open top section of the catalytic bed or includes a gas-permeable cover.

12. The reactor according to claim 1, wherein the first catalyst is suitable to decompose $N_2O$ into nitrogen and oxygen and the second catalyst is suitable to react NOx and $N_2O$ with a reducing agent.

13. A catalytic reactor adapted to process a gas flow by sequential passage through a first catalyst and a second catalyst,
   said reactor comprising a catalytic bed of a hollow cylindrical shape, having a vertical axis and having at least a lateral radial inlet section and at a top axial inlet section so as to determine an axial-radial flow through the bed, and having an outlet section, wherein:
   said catalytic bed comprises a first head zone which is adjacent to said top axial inlet section, and a second zone below said head zone;
   said head zone of the catalytic bed contains solely the first catalyst and does not face said outlet section of the catalytic bed, so that the effluent gas of said head zone passes into the underlying second zone of the catalytic bed;
   said second zone of the catalytic bed contains a layer of the first catalyst and a layer of the second catalyst, said layers being arranged coaxially one around the other;
   the reactor further comprising a gas-permeable separating baffle between said two coaxial layers of the second zone of the catalytic bed;
   wherein said separating baffle extends also into the head zone of the catalytic bed, the catalytic bed thus being divided into two coaxial portions, the first of said coaxial portions containing only the first catalyst, the second of said coaxial portions containing a layer of second catalyst up to a predefined level and containing a layer of first catalyst above said level;
   wherein the second coaxial portion optionally comprises a floating baffle which separates the layer of first catalyst from the layer of second catalyst;
   wherein said catalytic bed is of the inward axial-radial flow type and wherein, in the second zone of the catalytic bed containing two coaxial layers of the first and the second catalyst, the first catalyst is situated externally of the second catalyst;
   wherein the first catalyst is suitable to decompose $N_2O$ into nitrogen and oxygen and the second catalyst is suitable to react NOx and $N_2O$ with a reducing agent.

14. A process for the removal of nitrogen oxides NOx and nitrous oxide $N_2O$ from a gas stream, comprising the steps of:
   introducing the gas stream in a reactor according to claim

12 and containing a catalytic bed with two coaxial annular portions, passing the input gas stream through a first catalyst contained in the first annular portion of the catalytic bed, and/or contained in the upper layer of the second annular portion of the catalytic bed;

passing the so obtained partially conditioned gaseous effluent through a second catalyst contained in the bottom layer of said second annular portion, recovering a conditioned gas from said bottom layer of catalyst.

15. The process according to claim 14, wherein said gas stream containing NOx and $N_2O$ is an offgas current produced in a nitric acid synthesis process.

* * * * *